No. 871,809. PATENTED NOV. 26, 1907.
K. R. MARKS.
ANIMAL TRAP.
APPLICATION FILED MAR. 30, 1907.

WITNESSES:

Knox R. Marks, INVENTOR

By

ATTORNEYS

UNITED STATES PATENT OFFICE.

KNOX R. MARKS, OF ABINGDON, ILLINOIS.

ANIMAL-TRAP.

No. 871,809.  Specification of Letters Patent.  Patented Nov. 26, 1907.

Application filed March 30, 1907. Serial No. 365,574.

*To all whom it may concern:*

Be it known that I, KNOX R. MARKS, a citizen of the United States, residing at Abingdon, in the county of Knox and State of Illinois, have invented a new and useful Animal-Trap, of which the following is a specification.

This invention relates to animal traps such as used for catching mice and rats, and its object is to provide a novel form of trigger whereby the jaw of the trap can be securely locked, said trigger being designed to be released by the pressure of the rodent upon the base of the trap.

Another object is to provide a novel form of jaw whereby the base will receive the force of the blow exerted by the jaw transversely of its grain thereby preventing the base from splitting and enabling the same to be constructed of a comparatively soft wood.

Another object is to provide simple means whereby the jaw may be securely fastened to the base without the necessity of utilizing staples or other fastening devices, said means also constituting a holder for the releasing device.

With these and other objects in view the invention consists of certain novel features of construction and combinations of parts which will be hereinafter more fully described and pointed out in the claims.

In the accompanying drawings is shown the preferred form of the invention.

Figure 1:
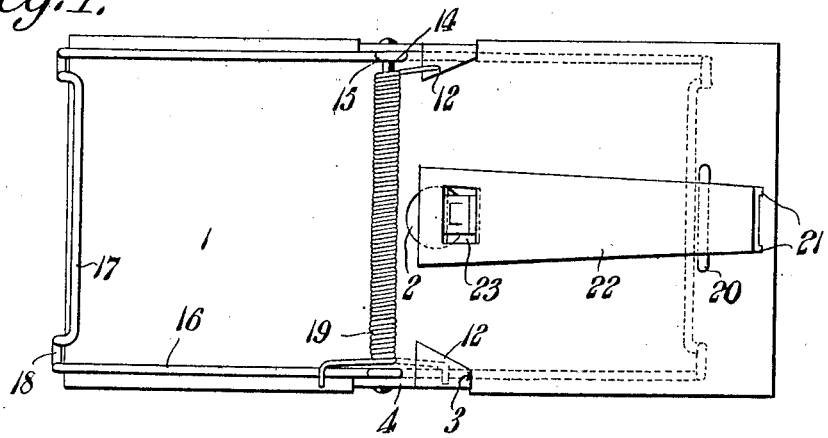
Figure 2:
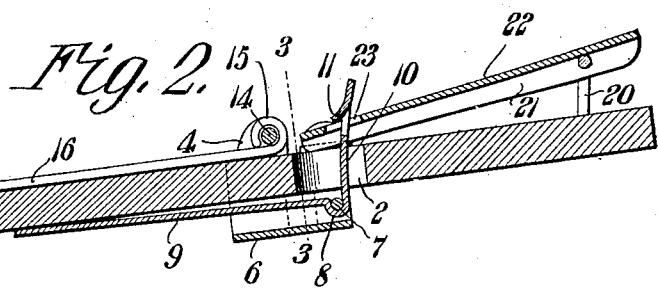
Figure 3:
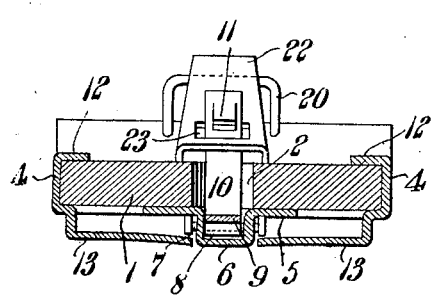
Figure 4:
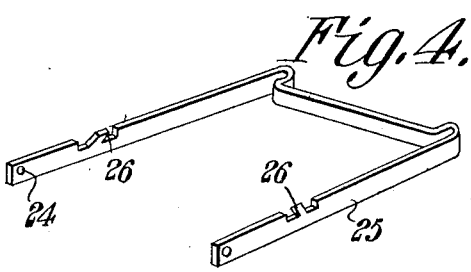
Figure 5:
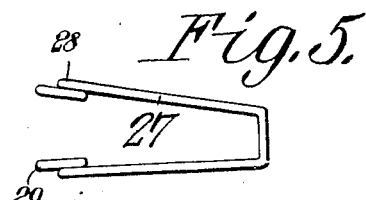

In said drawings: Figure 1 is a plan view of the trap after the same has been sprung, the position of the jaw while the trap is set being shown by dotted lines; Fig. 2 is a longitudinal section through the trap showing the positions of the parts after the trap has been sprung; Fig. 3 is a section on line x—x, Fig. 2; Fig. 4 is a detail view of a modified form of jaw; and Fig. 5 is a modified form of trigger.

Referring to the figures by characters of reference, 1 is a base formed of wood or other desired material and having an opening 2 adjacent the center thereof. Notches 3 are formed in the side edges of the base and seated in these notches are ears 4 upstanding from a metal cross strip 5 which extends beneath and bears against the bottom of the base. A portion of this cross strip extends under the opening 2, said portion being struck downward, as shown at 6 to form a channel in which is arranged a transversely extending pivot pin 7. Said pivot pin extends through a U-shaped extension 8 formed at one end of an actuating strip 9 and projecting from this extension is a locking tongue 10 which extends through the opening 2 and has a lip 11 struck outward therefrom. The channel 6 prevents lateral movement of the strip 9 and the parts connected thereto and the pin 7 is so disposed in relation to the bottom of the channel as to prevent the withdrawal of the U-shaped portion from engagement with the pin.

Each of the ears 4 has a clip 12 struck inward therefrom and designed to clamp upon the edge portion of the base 1 and therefore the cross strip 5 and the ears 4 are held in fixed relation with the base 1 without the necessity of using staples or other fastening devices. Supporting feet 13 are struck downward from the cross strip 5 at opposite sides of the channel 6 and these feet coöperate with the channeled portion to support the base 1 in inclined position upon the flat surface. By forming the feet angular, as shown, they can rest upon a soft substance without sinking thereinto from their own weight.

A pivot wire or rod 14 connects the ears and extends transversely above the base and this rod extends through eyes 15 formed at the ends of arms 16 constituting the side portions of the jaw. These arms are connected at their outer ends by an integral cross wire 17 constituting the gripping portion of the jaw and loops 18 are formed at the points of conjunction between this gripping portion and the arms and are bent downward so as to lap one end of the base 1 after the jaw has been sprung. The gripping portion of the jaw is straight and is designed to rest flat upon the base and transversely of the grain as shown in Figs. 1 and 2. A spring 19 is coiled about the rod 14 and one end thereof bears upon the base while the other end engages one of the arms of the jaw.

A staple 20 or other staple connecting device is secured upon the base and extends upward therefrom and this staple extends through flanges 21 projecting downward from the side edges of a plate 22 constituting the trigger. An opening 23 is formed within this trigger and is designed when the trigger is in lowered position to register with the opening 2 and to receive the tongue 10 and the lip 11 thereon.

When it is desired to set the trap trigger 22 is swung upward and the jaw is moved back against the tension of spring 19 so as to assume a position upon the base adjacent the staple 20. The trigger is then swung in position over the jaw and the tongue 10 is extended through opening 23 and lip 11 placed in engagement with one edge of the opening. The free end of the strip 9 will therefore be held spaced from the base 1 and will contact with the surface supporting the trap, said trap being upheld solely by the strip and the feet 13 and channeled portion 6. A suitable bait may be placed upon the trap and when a rodent places its weight upon the base to remove the bait the base will be pushed downward toward the strip 9 and cause the lip 11 to swing back out of engagement with the trigger 22. The tensioned spring 19 will therefore throw the jaw around into position indicated by full lines in Figs. 1 and 2, and the loops 18 will tend to prevent the jaw from throwing the rodent laterally. In other words, these loops and the gripping portion 17 constitute a yoke which embraces the rodent and prevents it from extricating itself. It will be seen that in the construction of the trap it is only necessary to employ one staple and that all nails or similar fastening devices are entirely eliminated. By attaching the parts to the base as shown there is no danger of the base becoming split and as the gripping portion 17 rests upon the base and extends transversely of its grain the operation of the jaw will not tend to split the base. By reason of these advantages the base can be formed of a comparatively soft wood.

Instead of forming the jaw of a length of wire as shown in Figs. 1 and 2 it can be made of a flat strip of metal, as shown in Fig. 4 in which event openings 24 are formed in the free ends of the arms 25 for the reception of the pivot rod or wire 14 and lugs 26 are formed with the arms for engagement with the spring 19. The trigger can be formed of wire instead of sheet metal and such a modified construction has been disclosed in Fig. 5. It will be seen that this modified construction is made of a single length of wire bent to form arms 27 terminating in eyes 28 adapted to receive the supporting staple 20 and short fingers 29 extend from the eyes. These fingers as well as the small end of trigger 22, are designed to rest in the path of the portion 17 of the jaw when the trap is not set and the trigger is extended beyond the end of the base. Therefore when the jaw is swung into set position it will strike these fingers and throw the trigger into locking position.

What is claimed is:

1. In a trap the combination with a base; of a cross strip disposed upon one face thereof and having end portions embracing and clamped upon the base, and a spring actuated jaw movably connected to said strip.

2. In a trap the combination with a base; of a cross strip disposed upon one face of the base having its end portions embracing and clamped upon opposite faces thereof, a spring actuated jaw movably connected to said strip, a trigger, and a locking tongue movably mounted within the cross strip and disposed to engage the trigger.

3. In a trap the combination with a base; of a cross strip disposed upon one face thereof and having its end portions embracing and clamped upon opposite edges of the base, a spring actuated jaw movably connected to the cross strip, a locking tongue movably connected to said strip and projecting through the base, and a jaw retaining trigger supported by the base and disposed to be engaged by the tongue.

4. In a trap the combination with a base having recessed edges; of a cross strip disposed upon one face of the base and having end portions seated within the recesses and embracing the base, a spring actuated jaw carried by the cross strip, and means for holding the jaw set.

5. In a trap the combination with a base having a recessed edge; of a cross strip disposed upon one face of the base and having end portions embracing opposite edges of the base, one of said portions being disposed within the recesses, said cross strip having a channeled portion, a locking tongue extending through the base, an actuating strip integral with the tongue and projecting from the channeled portion, a holding pin engaging the locking tongue and constituting a fulcrum therefor, said channeled portion constituting means to prevent displacement of the actuating strip, a trigger disposed to be engaged by the tongue, and a spring actuated jaw movably connected to the cross strip.

6. In a trap the combination with a base, a spring actuated jaw, and a trigger; of a cross strip embracing the base and having a channeled portion, a holding pin disposed transversely within the channeled portion, and a trigger engaging tongue extending from the cross strip, said strip and tongue forming a hooked portion constituting a seat for the holding pin and retained in engagement therewith by the channeled portion.

7. In a trap the combination with a base; of a spring actuated jaw movably connected thereto and having a straight intermediate gripping portion disposed to contact throughout its length with the base, and loops extending from the ends of the gripping portion and disposed to lap one edge of the base, said loops and gripping portion constituting a yoke.

8. In a trap the combination with a base having recessed edges; of a cross strip disposed upon one face of the base and having its end portions seated within the recesses and embracing opposite portions of the base, a trigger pivotally supported above the base, a spring actuated jaw movably connected to the end portions of the cross strip and disposed to be overlapped by the trigger when set, an actuating strip disposed beneath the base and having one end spaced therefrom when the trap is set, and a locking tongue extending from said strip and disposed to engage and hold the trigger.

9. In a trap the combination with a base and a trigger pivotally supported thereabove; of a cross strip disposed upon one face of the base and having its end portions embracing opposite edges of the base, a spring actuated jaw connected to said end portions, said cross strip having a channeled portion, an actuating strip fulcrumed within the channeled portion, a trigger locking tongue extending from said strip and through the base, and supporting feet extending downward from the cross strip.

10. In a trap the combination with a base; of a jaw pivotally supported above the base, a locking device, and a trigger pivotally mounted on the base and having one end disposed to lap the jaw when set and engage the locking device, the other end of said trigger being disposed to lie in the path of the jaw during the setting operation whereby the trigger is swung into locking position.

In testimony that I claim the foregoing as my own, I have hereto affixed my signature in the presence of two witnesses.

KNOX R. MARKS.

Witnesses:
JOHN R. MORELAND,
W. C. MARKS.